Patented June 20, 1939

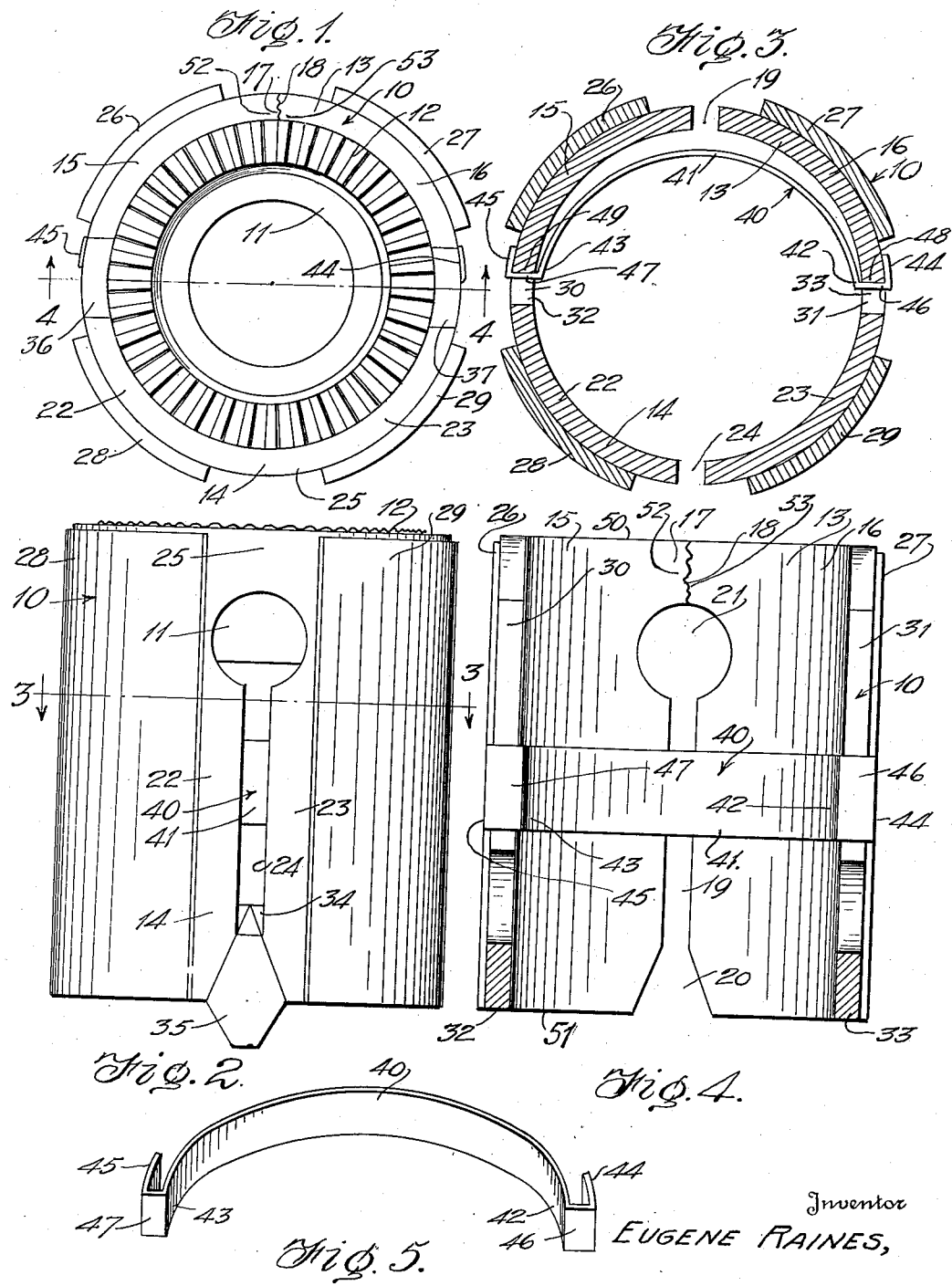

2,163,497

UNITED STATES PATENT OFFICE 2,163,497

COASTER BRAKE REPAIR DEVICE

Eugene Raines, Memphis, Tenn., assignor to Berry Cohen and Dave Bronstein, both of Atlanta, Ga.

Application December 22, 1937, Serial No. 181,237

3 Claims. (Cl. 192—6)

This invention relates to brake repair means and more particularly to brake shoe repair devices.

One object of this invention is to provide a brake repair means. Another object of this invention is to provide a brake shoe repair device. A further object of this invention is to provide a new and improved brake repair device. Still another object is to provide a new and improved brake shoe repair device. A further object is to provide a brake shoe repair device which is relatively inexpensive.

I have attained the foregoing objects by providing an arcuate member adapted to grip remote portions of the brake shoes and to retain the normally interconnected parts of adjacent shoes in a relatively fixed position without interfering with the normal expansive action of the shoes during operation.

Other objects and advantages of this invention will appear in the following description when taken in connection with the accompanying drawing.

In the drawing wherein like parts have the same numerals in the various figures, Fig. 1 is a plan view of a brake shoe and the fixed abutment assembled with the shoe. Fig. 2 is a side elevation of the brake shoe in Fig. 1 showing the fixed abutment and the actuating member assembled relatively with the shoe. Fig. 3 is a transverse cross section taken on the line 3—3 of Fig. 2. Fig. 4 is a longitudinal cross section taken on the line 4—4 in Fig. 1. Fig. 5 is an enlarged perspective view showing the device by itself.

Considering the drawing in greater detail, in Fig. 1 the brake shoe 10 is of a type commonly adapted for use in connection with coaster brakes for bicycles or the like and is shown in assembled relation with respect to the fixed abutment member 11 which is normally fixed with respect to the frame of the vehicle. The radially extending teeth 12 are normally engaged with a similar toothed member, which is not shown but which is fastened on the frame of the bicycle. The shoe member 10 comprises an interconnected pair of split expansible shoe members 13 and 14. The shoe member 13 is composed of two segments 15 and 16 respectively normally interconnected by the portion 17 which latter part is illustrated as having a fracture 18 extending transversely across it. Each shoe of the pair of brake shoes is split by a slot. The shoe 13 by the slot 19 extending from the tapered openings 20 adjacent one axial end of the shoe and terminating in the circular opening 21 near the opposite axial end of the shoe and adjacent the interconnecting part 17. The opposite shoe of the pair is clearly seen in Fig. 2 and comprises the segments 22 and 23 which are divided by the slot 24 as previously described which are interconnected by the portion 25. The wear surfaces on this pair of shoes comprises the substantially rectangularly shaped friction members 26 and 27 which are substantially arcuate in transverse cross section. The wear surfaces of the opposite shoe member 14 comprises the friction members 28 and 29. All of these wear surfaces are secured by rivets or in some other appropriate manner to the shoe member 10.

The segments comprising each member of the pair of shoes have been described by using the upper and lower halves of the integral brake shoe member as the individual brake shoes of the pair. It will be readily understood however that the adjacent segments 15 and 22 on the left and 16 and 23 on the right in Fig. 1 may be considered as the divided parts of each brake shoe. In this instance, the segments will be divided by the slots 30 and 31 and will be interconnected by the portions 32 and 33. It will be readily understood that the device may correspondingly be described as a brake shoe having four interconnected shoe segments 15, 16, 22 and 23 each of which is arcuate in transverse cross section and the alternate opposite ends of each of which is connected to adjacent segments.

The brake shoe is concentrically mounted within the brake drum carried by the wheel and is supported between the fixed abutment 11 at one end and the actuating element 34 at the other end. The application of the brake forces the wedge shaped parts 35 an actuating member into the opposite slots 19 and 24 thereby forcing the brake shoes radially. The wedge shaped portions 36 and 37 carried on the fixed abutment 11 are at the same time forced into the slots 30 and 31 to expand the shoes at points 90 degrees removed from the first named wedge members. If the brake shoe should be broken or fractured in one of the interconnecting portions 17, 25, 32 or 33 the brake shoe will have a tendency to expand radially by equal amounts all around its circumference instead of expanding at one end of the shoe with respect to the slots 19 and 24 and at the opposite end of the shoe with respect to the slots 30 and 31. In the normal course of events, the only thing that can be done to correct this is to purchase a new brake shoe or to have the parts welded together, the latter of course is relatively unsatisfactory for the reason that it is not at all unlikely that the welding operation will cost more than a new part.

It is to overcome these difficulties and to provide a simple and inexpensive means which may be applied to the damaged or broken brake shoe so as to preserve its usefulness without materially adding to the cost. To accomplish these results the brake shoe repair device 40 is provided. This device comprises a substantially arcuate body part 41 of strap-like form having end terminal portions 42, 43, upstanding oppositely disposed incurved gripping flanges 44, 45 outwardly of and spaced from said end terminal portions 42, 43 respectively, and horizontally disposed oppositely extending flanges 46, 47 merging into the lower ends of the flanges 44, 45 respectively and into the opposite ends of the said body 41. The flanges 46, 47 constitute couplers between body part 41 and the flanges 44, 45. The end terminal portions 42, 43 coact with the flanges 44, 45 to provide each end of the device 40 with a gripping means for the shoe. The flanges 47, 48 form each end of the device with a seat or abutment for a side edge of the shoe. The body part 41 forms a holder or retainer for the gripping means and has its radius materially less than the radius of the shoe. When the device is used the body part 41 is disposed within, spaced from the inner face and extends towards the shoe.

When the shoe becomes impaired, such as by way of example a fracture occurring in the shoe portion 17, the device 40 is then connected to the shoe in a manner as shown in Figure 3, and when so connected the flanges 44, 45 bear against the outer face of the shoe, the side edges 48, 49 of the latter seat against the flanges 46, 47 respectively and the body part 41 spans the two segments of the shoe. When the device is arranged in the manner as shown in Figure 3 it acts as a means to restore and preserve the usefulness of the impaired shoe. It is preferable to locate the member 40 closer to the end 50 having the fracture 18 than to the other end 51 away from the fracture. In this way the repair device will retain the broken portions 52 and 53 together without any substantial interference with the expanding action of the brake shoes at their opposite ends. In this way a simple and inexpensive device is provided which retains the abutting portions adjacent the fracture together without affecting the normal brake action of the brake shoe and its related parts.

Although a preferred embodiment of this invention is shown and described, variations within the true spirit and scope of the same are to be determined by the appended claims.

I claim:

1. A repair device for restoring and preserving the usefulness of an impaired expansible brake shoe of a form corresponding to the segment of a circle, said device comprising a straplike holder of arcuate form for disposing within, extending towards and of materially less radius than the radius of the shoe, said holder being formed with end terminal portions, and oppositely disposed means connected to and extended laterally from the ends of said holder, said means coacting with said end terminal portions to provide grippers for aligned side portions of the shoe and abutments for the side edges of the shoe.

2. A repair device for restoring and preserving the usefulness of an impaired expansible brake shoe of a form corresponding to the segment of a circle, said device comprising a strap-like holder of arcuate form for disposing within, extending towards and of materially less radius than the radius of the shoe, said holder being formed with end terminal portions and oppositely disposed means connected to and extended laterally from the ends of said holder, said means coacting with said end terminal portions to provide grippers for aligned side portion of the shoe and abutments for the side edges of the shoe, each of said means consisting of a horizontal disposed flange merging at its inner end into an end of the holder and an upstanding flange merging at its lower end into the outer end of the horizontal flange.

3. A repair device for the purpose set forth comprising a strap-like holder of arcuate contour, a pair of oppositely outwardly extending horizontally disposed flanges merging at their inner ends into the ends of said holder, and a pair of upstanding oppositely disposed incurved flanges merging at their lower ends into the outer ends of the horizontal disposed flanges and spaced from the holder.

EUGENE RAINES.